(12) United States Patent
Shastri et al.

(10) Patent No.: US 9,417,412 B2
(45) Date of Patent: Aug. 16, 2016

(54) ARRANGEMENT FOR PLACEMENT AND ALIGNMENT OF OPTO-ELECTRONIC COMPONENTS

(71) Applicant: Cisco Technology, Inc., San Jose, CA (US)

(72) Inventors: Kalpendu Shastri, Orefield, PA (US); Ravinder Kachru, Los Altos Hills, CA (US); Kishor Desai, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/339,921

(22) Filed: Jul. 24, 2014

(65) Prior Publication Data

US 2016/0209606 A1    Jul. 21, 2016

Related U.S. Application Data

(63) Continuation of application No. 13/674,902, filed on Nov. 12, 2012, now Pat. No. 8,830,466.

(60) Provisional application No. 61/558,788, filed on Nov. 11, 2011, provisional application No. 61/558,006, filed on Nov. 10, 2011.

(51) Int. Cl.
    *G01B 11/00*    (2006.01)
    *G02B 6/42*    (2006.01)

(52) U.S. Cl.
    CPC ..................... *G02B 6/423* (2013.01)

(58) Field of Classification Search
    USPC ......... 356/399–401, 619–623, 621, 614, 615; 385/88, 52, 129, 14–15, 31, 39, 49, 385/131–132, 97
    See application file for complete search history.

(56) References Cited

U.S. PATENT DOCUMENTS

| 6,095,697 | A  | 8/2000  | Lehman et al. |
|-----------|----|---------|---------------|
| 6,393,171 | B2 | 5/2002  | Sasaki et al. |
| 6,724,096 | B2 | 4/2004  | Werner et al. |
| 6,853,778 | B2 | 2/2005  | Helbing et al. |
| 7,229,219 | B2 | 6/2007  | Lee et al. |
| 7,308,167 | B2 | 12/2007 | Trott et al. |
| 7,613,368 | B2 | 11/2009 | Hougham et al. |
| 7,855,377 | B2 | 12/2010 | Lee |

(Continued)

FOREIGN PATENT DOCUMENTS

EP    1308757    5/2003

OTHER PUBLICATIONS

PCT/US2012/064758 International Search Report and Written Opinion dated Nov. 4, 2013.

*Primary Examiner* — Tri T Ton
(74) *Attorney, Agent, or Firm* — Patterson + Sheridan, LLP (57) ABSTRACT

An arrangement for providing passive alignment of optical components on a common substrate uses a set of reference cavities, where each optical device is positioned within a separate reference cavity. The reference cavities are formed to have a predetermined depth, with perimeters slightly larger than the footprint of their associated optical components. The reference cavity includes at least one right-angle corner that is used as a registration corner against which a right-angle corner of an associated optical component is positioned. The placement of each optical component in its own reference cavity allows for passive optical alignment to be achieved by placing each component against its predefined registration corner.

24 Claims, 4 Drawing Sheets

(56) References Cited

U.S. PATENT DOCUMENTS

| | | |
|---|---|---|
| 7,978,940 B2 | 7/2011 | Steijer et al. |
| 8,830,466 B2 * | 9/2014 | Shastri et al. ............... 356/399 |
| 2003/0198426 A1 * | 10/2003 | Arima .................. G02B 6/43 385/14 |
| 2003/0223672 A1 | 12/2003 | Joyner et al. |
| 2011/0164849 A1 | 7/2011 | Rogers et al. |
| 2012/0027346 A1 | 2/2012 | Castagna et al. |
| 2012/0189244 A1 | 7/2012 | Bowen et al. |
| 2013/0314707 A1 | 11/2013 | Shastri et al. |

* cited by examiner

ARRANGEMENT FOR PLACEMENT AND ALIGNMENT OF OPTO-ELECTRONIC COMPONENTS

CROSS-REFERENCE TO RELATED APPLICATIONS

This application is a continuation of co-pending U.S. patent application Ser. No. 13/674,902, filed Nov. 12, 2012, which claims benefit of U.S. Provisional Application No. 61/558,006 filed on and Nov. 10, 2011 and U.S. Provisional Application No. 61/558,788 filed on Nov. 11, 2011. The aforementioned related patent applications are herein incorporated by reference in their entirety.

TECHNICAL FIELD

The present disclosure relates generally to opto-electronic assemblies, particularly to the utilization of precision-created reference cavities for providing passive alignment between optical components of an opto-electronic assembly.

BACKGROUND

Many types of opto-electronic modules comprise a number of separate optical and electrical components that require precise placement relative to one another. A silicon (or glass) carrier substrate (sometimes referred to as an interposer) is generally used as a support structure to fix the location of the components and may, at times, also provide the desired electrical or optical signal paths between selected components. In other arrangements, the optical and electrical components may be directly placed on and within a silicon surface layer of a silicon-on-insulator (SOI)-based optical platform. Regardless of the structure of the support arrangement, optical alignment between various optical components is required to ensure that the integrity of the optical signal path is maintained.

Active alignment processes generally require the use of visual systems in combination with micro-positioning arrangements to adjust the position of a first optical component with respect to another optical component. These active alignment arrangements are generally slow and expensive, impacting throughput and cycle time in assembly operations. In contrast to active alignment, "passive" optical alignment arrangements may be utilized, which rely on matching and mating alignment fiducials formed on both the substrate and each optical component. As one drawback, passive alignment arrangements add cost and complexity to the fabrication of the individual components by requiring the additional steps associated with forming the fiducials on each optical component. Moreover, these opto-electronic assemblies are typically built as individual units and, as a result, the need to perform optical alignment (active or passive) on a unit-by-unit basis becomes expensive and time-consuming.

Indeed, as the demand for opto-electronic modules continues to increase, the individual unit assembly approach has become problematic. Wafer level packaging is considered to be a more efficient and cost-effective approach, with one exemplary arrangement of wafer level packaging disclosed in our co-pending application Ser. No. 13/463,408, filed May 3, 2012 and herein incorporated by reference.

In our co-pending application, a silicon wafer is utilized as a "platform" (i.e. interposer or carrier) upon which all of the components for a multiple number of opto-electronic modules are mounted or integrated, with the top surface of the silicon interposer used as a reference plane for defining the optical signal path for optical alignment purposes. The use of a single silicon wafer as a platform for a large number of separate modules allows for a wafer level assembly process to efficiently assemble a large number of modules in a relatively short period of time.

While the use of wafer level assembly does improve the efficiency of the fabrication process, the use of an active alignment process remains a drawback in terms of its complexity and low throughput. As the size and complexity of opto-electronic assemblies continues to increase, the ability to find locations on both the substrate and the optical components to create alignment fiducials for passive alignment alternatives becomes increasingly difficult.

BRIEF DESCRIPTION OF THE DRAWINGS

The accompanying drawings, which are incorporated in and constitute a part of this disclosure, illustrate various embodiments of the present invention. In the drawings:

FIG. 6 illustrates an alternative arrangement to the configuration of FIGS. 3-5, with a plurality of reference cavities directly etched in a common silicon substrate of an SOI-based arrangement used to support a plurality of optical components, where FIG. 6(a) is a top view of the SOI-based arrangement and FIG. 6(b) is a side view of the SOI-based arrangement, taken along line 6-6 of FIG. 6(a);

DESCRIPTION OF EXAMPLE EMBODIMENTS

Overview

An opto-electronic assembly is provided comprising a substrate (generally of silicon or glass) for supporting a plurality of interconnected optical and electrical components. A reference cavity is formed through the surface of the substrate at each location where an optical component is to be placed. Each reference cavity is formed to have a depth no greater than about 30 microns, with a perimeter slightly larger than the footprint of the associated optical component. Each reference cavity includes at least one right-angle corner that is used as a registration corner against which a right-angle corner of an associated optical component is positioned. The placement of each optical component in its own reference cavity allows for passive optical alignment to be achieved by placing each component against its predefined registration corner. Conventional bonding techniques may be used to permanently attach each component in its precise location. Alternatively, an additional feature of the present invention includes the formation of grooves (or ribs) within the "floor" of the reference cavities, with bonding material preferentially disposed within the grooves (or between the ribs) to form thin bond lines.

Example Embodiments

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Figure 1:
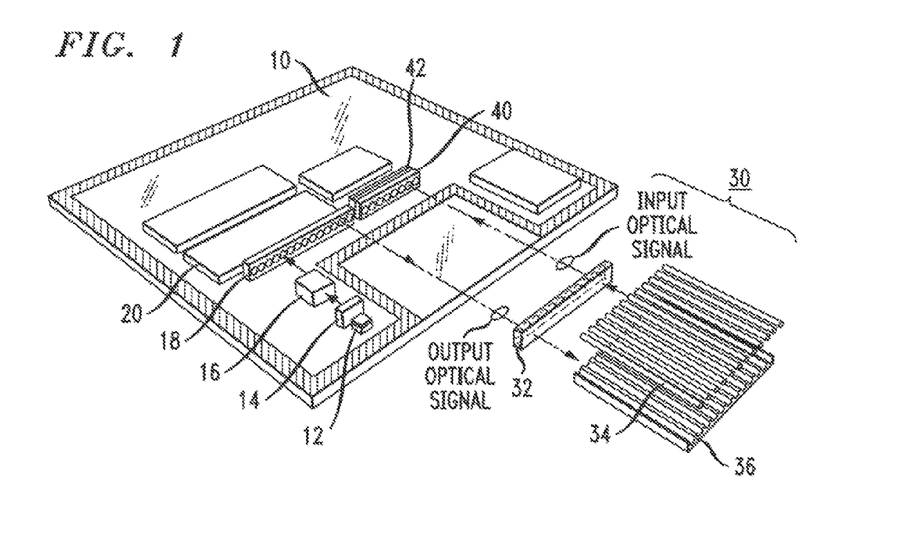
FIG. 1 is an isometric view of an opto-electronic module assembly, illustrating the placement of optical components in an aligned configuration, as well as an exemplary optical signal path between the aligned components.

FIG. 1 is an isometric view of an opto-electronic module assembly, illustrating the placement of optical components in an aligned configuration, as well as an exemplary optical signal path between the aligned components. As shown, a substrate 10 is used as a support member to hold a plurality of separate optical components in an aligned configuration. In this particular arrangement, the assembly includes a laser diode 12 that is a source of a propagating optical signal. A micro lens 14 is shown as placed in the optical output signal path from the laser diode 12. An optical isolator 16 is positioned beyond the micro lens 14 and is used to prevent reflected optical signals from re-entering the laser diode 12. The signal exiting the optical isolator 16 then passes through a micro lens array 18 and enters a CMOS photonic chip 20.

Signal processing operations are performed on the optical signal within the photonic chip 20 (for example, modulation with a data signal), creating an output optical signal that will exit the photonic chip 20 as shown, pass again through the micro lens array 18 and be coupled into an optical coupling interface arrangement 30. In the particular embodiment shown in FIG. 1, the optical coupling interface arrangement 30 is shown in an exploded view and comprises a micro lens array 32 and an associated optical fiber array 34, with the optical fiber array 34 supported on a substrate 36. The optical coupling interface arrangement 30 is also shown as providing a signal path for an input (received) optical signal which propagates along one or more fibers of the optical fiber array 34. The input optical signal then passes through the microlens array 32 and is thereafter directed through a collimating lens 40 into an optical receiving component 42.

It is to be understood that this set of optical components is exemplary only, illustrating one particular arrangement where optical alignment between various components is required. In general, any arrangement of optical components (passive and/or active) that are disposed on a common substrate and need to arranged in an optically aligned configuration may utilize the reference cavity passive alignment attributes of the present invention.

In following the optical signal path through the system shown in FIG. 1, it is obvious that optical alignment between the various optical components is important. For example, the output optical signal from the laser diode 12 has a relatively small beam waist and needs to be aligned within a few microns of the focal point of the microlens 14. Optical alignment also needs to be maintained, for example, along the signal path through the isolator 16, the microlens array 18 into an optical input port (not shown) of the photonic chip 20. Heretofore, techniques described above (such as active alignment using a video system, or passive alignment using mating fiducial features on the components and the substrate) would be used to achieve optical alignment.

Figure 2:
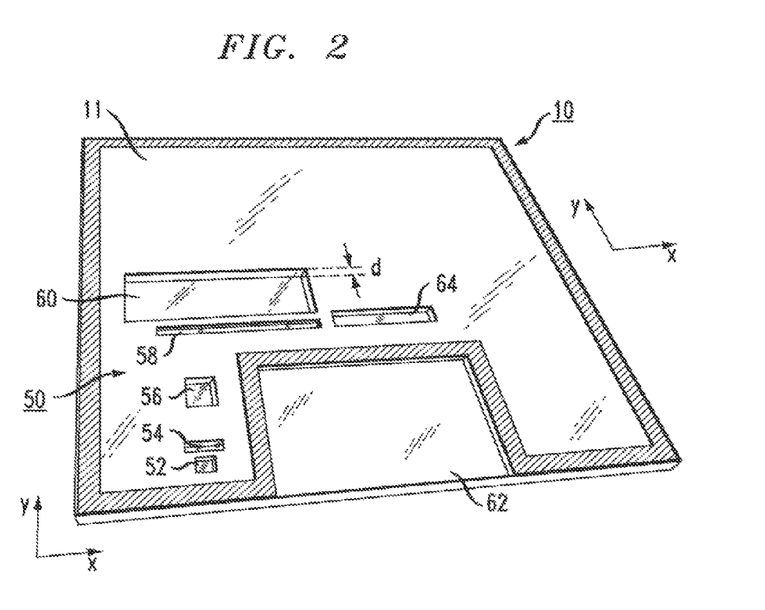
FIG. 2 is an isometric view of the substrate of FIG. 1, in its unpopulated form, showing a plurality of reference cavities used for placement and passive alignment of optical components in accordance with the present invention.

In accordance with the present invention, passive alignment between optical components is achieved by utilizing reference cavities, formed within the top surface of a substrate supporting the optical components, with a separate reference cavity used to contain and properly locate each optical component such that passive optical alignment between the optical components is achieved. FIG. 2 is an isometric view of the substrate 10, in its unpopulated form, showing a plurality of reference cavities used for placement and passive alignment of optical components in accordance with the present invention.

In particular, FIG. 2 illustrates a plurality of separate reference cavities 50 that are formed through a top surface 11 of the substrate 10 and used to provide passive optical alignment in accordance with the present invention. Various processes, as described hereinafter, may be used to form the reference cavities in predefined locations, to a predefined depth and having predefined x-y dimensions (the x-y plane defining the top surface 11 of the substrate 10). In comparison to prior art passive alignment schemes, the arrangement of the present invention does not require the use of alignment fiducials and, therefore, does not require extra processing of the optical components to create a passive alignment structure. The elimination of alignment fiducials on the substrate is also beneficial in systems where extra space for such elements is at a premium.

For the particular set of optical components shown in FIG. 1, the substrate 10 is processed to include a set of seven separate reference cavities: a laser reference cavity 52, a microlens reference cavity 54, an isolator reference cavity 56, a microlens array reference cavity 58, a photonic chip reference cavity 60, an optical interface connector reference cavity 62 and a receiver lens array cavity 64. In the particular arrangement as shown in FIG. 2, each reference cavity exhibits a rectangular perimeter (in the x-y plane of substrate 10), with a depth d sufficient to support the associated optical component. Each reference cavity is formed to comprise the same depth d, which is generally less than about 30 μm, and preferably on the order of 5-20 μm.

In comparing the optical components as shown in FIG. 1 with their respective reference cavities as shown in FIG. 2, each reference cavity is shown as including an x-y perimeter that essentially matches the "footprint" of its associated optical component (i.e., a square component such as the laser diode 12 has a square reference cavity 52, a rectangular component such as the photonic chip 20 has a rectangular reference cavity 60). This configuration of matching perimeters is a preferred, but not mandatory, element of the inventive arrangement. In general, as long as each optical component includes at least one right-angle corner, a reference cavity having a matching right-angle corner may be used to fix (i.e., "register") the location of the optical component with respect to the x-y plane of the optical substrate 10. By predefining the registration corners to be used for this purpose, the plurality of reference cavities 50 can be formed relative to one another such that passive optical alignment occurs upon placement of the optical components in their respective reference cavities, with a predefined corner of each optical component positioned against a predefined corner of its associated reference cavity.

It is to be understood that prior to placing the optical components in their respective reference cavities, a bonding material (such as an epoxy, not shown) is injected into the cavity, whereupon it will be cured after placement of the optical components, providing a permanent attachment of the optical component within its respective reference cavity.

Figure 3:
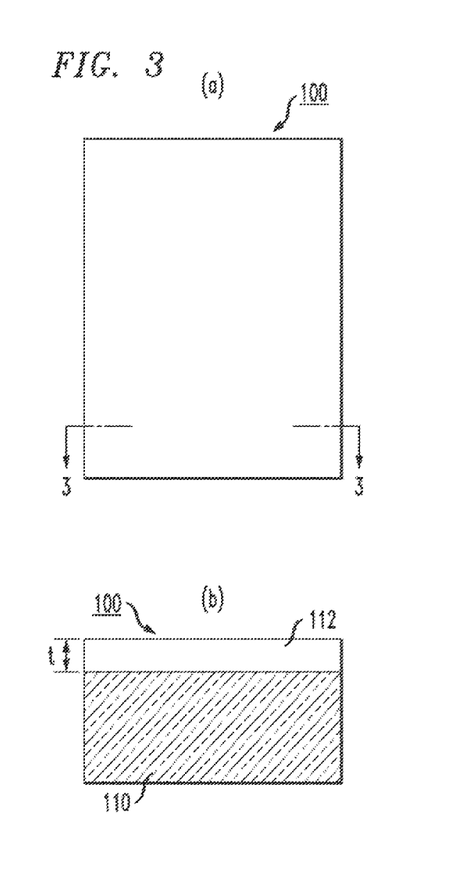
FIGS. 3-5 illustrate an exemplary set of processing steps used to create reference cavities in a passivation layer overlying a substrate in accordance with one embodiment of the present invention, with FIGS. 3(a), 4(a) and 5(a) showing top views of the optical substrate and FIGS. 3(b), 4(b) and 5(b) showing cut-away side views of the same arrangement, with regions of the passivation layer removed to form the reference cavities.
Figure 4:
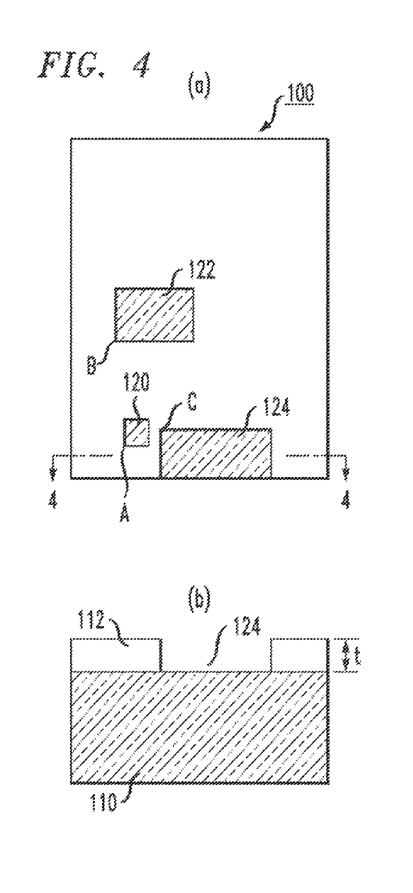
Figure 5:
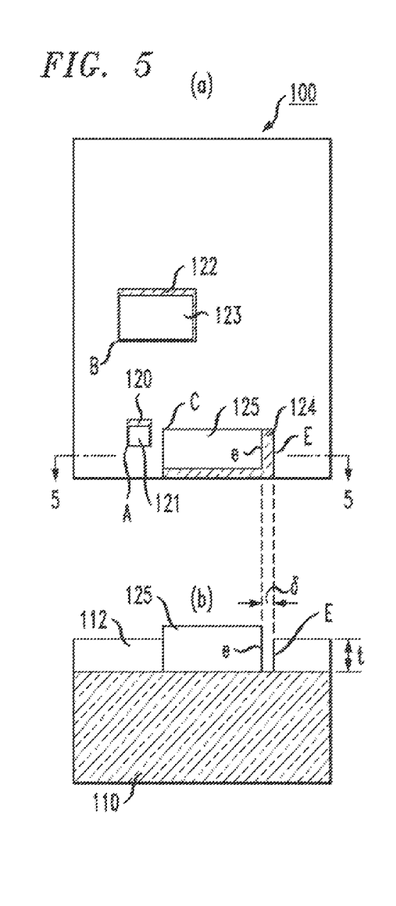

FIGS. 3-5 illustrate an exemplary set of processing steps used to create reference cavities in a passivation layer overlying a substrate in accordance with one embodiment of the present invention, with FIGS. 3(a), 4(a) and 5(a) showing top views of the optical substrate and FIGS. 3(b), 4(b) and 5(b) showing cut-away side views of the same arrangement, with regions of the passivation layer removed to form the reference cavities.

In particular, FIG. 3(a) is a top view of an optical substrate 100, prior to the creation of any of the reference cavities, with FIG. 3(b) being a side view of the optical substrate 100, taken along line 3-3 of FIG. 3(a). As evident in the view of FIG. 3(b), the optical substrate 100 comprises a support layer 110, with a relatively thin passivation layer 112 disposed over the support layer 110. In the particular embodiment associated with FIGS. 3-5, the reference cavities are formed by creating openings in passivation layer 112. The thickness t of passivation layer 112 thus defines the depth of the reference cavities. As stated above, a depth on the order of 5-20 μm is suitable for the purposes of the present invention (although values less than or greater than this preferred range may also be used, as long as the optical signal path is not blocked when the optical components are placed in their reference cavities).

In accordance with this embodiment of the present invention, which may take the form of an interposer configuration used to support optical and electronic devices within a larger package structure, various materials may be used to form both the support layer 110 and the passivation layer 112. For example, the support layer 110 may be formed of a silicon or glass material, with the passivation layer 112 formed of a polymer material, such as polyimide, or any other suitable dielectric material (e.g., silicon dioxide).

FIG. 4 illustrates an exemplary set of three reference cavities as formed within the optical substrate 100. As shown in the top view of FIG. 4(a), the arrangement is formed to include a square reference cavity 120, a rectangular reference cavity 122 and an "edge" rectangular reference cavity 124. These cavities are formed by removing the portions of the passivation layer 112 contained in the defined regions. FIG. 4(b) is a cut-away side view of the arrangement of FIG. 4(a), taken along line 4-4 of FIG. 4(a). Various techniques, well-known in the art, may be used to precisely define the location and dimensions of each of these reference cavities, as well as remove the portions of the passivation layer 112 in each reference cavity region. For example, conventional photolithographic techniques used in standard CMOS processing may be used to pattern the passivation layer 112 to define the x-y perimeter of each reference cavity and then remove selected portions of the passivation material using an etching process. By knowing a set of defined locations for the optical components as determined to provide optical alignment, the locations of their respective reference cavities on the optical substrate can be defined. Those skilled in the art will recognize that a myriad of techniques are available to create these cavities with the desired properties.

As shown, each reference cavity includes at least one right-angle corner that is used as a registration corner location for precisely aligning a placed optical component with respect to the optical substrate. Referring to FIG. 4(a), the reference cavity 120 is defined as having a registration corner A, the reference cavity 122 is defined as having a registration corner B and the reference cavity 124 is defined as having a registration corner C. Each cavity is also slightly larger than the footprint of the optical component it is to support so that the optical component may be placed in its cavity and then moved to physically contact the pair of sidewalls forming the registration corner of the reference cavity. For the purposes of the present invention, "slightly larger" is deemed to mean having a length and width of between 1-5 microns greater than the length and width of the associated optical component. Hereafter, these "slightly larger" length and width (x and y) dimensions of the reference cavity will be defined as creating an "oversized" reference cavity.

Once the oversized reference cavities are formed, an adhesive material (such as an appropriate solder or bonding material, not shown) is disposed in each cavity and then the optical components are placed in their respective reference cavities. This step is shown in FIG. 5, where FIG. 5(a) is a top view, showing a first optical component 121 placed in the square reference cavity 120, a second optical component 123 placed in the rectangular reference cavity 122, and a third optical component 125 placed in the edge rectangular cavity 124. In accordance with the present invention, the respective reference corners of these optical components are placed against registration corners A, B and C of their respective cavities. By virtue of fixing the x-y location of each of these optical components, passive optical alignment between the optical components is achieved and the integrity of an optical signal path between each component will be maintained.

The relative sizes of the reference cavities with respect to their optical components is shown in FIGS. 5(a) and (b), which demonstrates the oversized nature of the reference cavities. While not extreme, a gap is clearly evident between an edge E of the reference cavity 124 and edge e of the optical component 125. In each case, it is clear that registration between a defined registration corner of a reference cavity and a corner of an associated optical component is provided, creating passive alignment between the optical components in accordance with the present invention.

Figure 6:
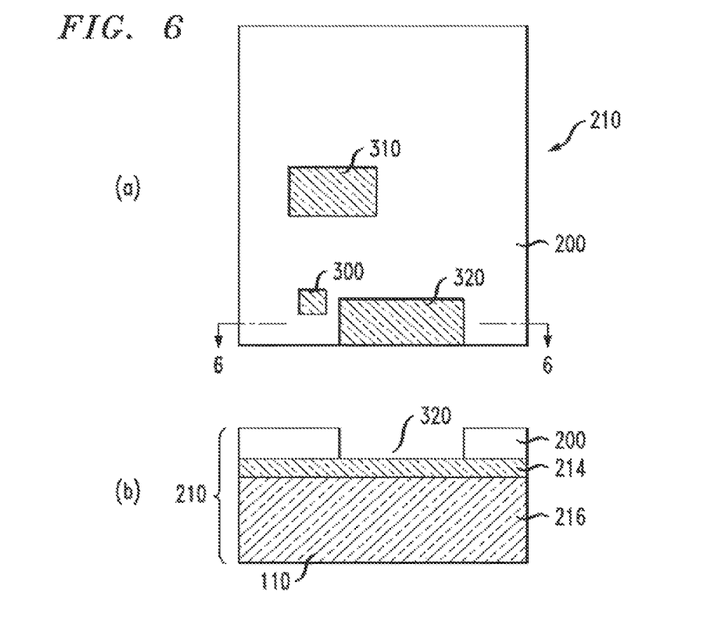

The exemplary process as outlined in FIGS. 3-5 is based upon the use of a substrate in the form of a two-layer combination of a support layer and a passivation layer. This arrangement may typically be found in the formation of an interposer (or carrier) element of an opto-electronic assembly. As mentioned above, it is also possible to form reference cavities of the present invention directly within a silicon surface layer of an SOI-based optical assembly. FIG. 6 illustrates an alternative arrangement to the configuration of FIGS. 3-5, with a plurality of reference cavities directly etched in a common silicon substrate of an SOI-based arrangement used to support a plurality of optical components, where FIG. 6(a) is a top view of the SOI-based arrangement and FIG. 6(b) is a side view of the SOI-based arrangement, taken along line 6-6 of FIG. 6(a).

In particular, FIG. 6 illustrates an SOI-based embodiment of the present invention, where a plurality of reference cavities are formed within a silicon surface layer 200 of an SOI-based arrangement 210. FIG. 6(a) shows a set of three reference cavities 300, 310 and 320 as formed in predefined locations on the silicon surface layer 200. In the side view of FIG. 6(b), the reference cavity 320 is shown as formed through the depth of the silicon surface layer 200. A dielectric layer 214 (also referred to in the art as buried oxide layer) and a silicon substrate 216 are shown as completing the defined SOI-based structure 210. In this case, a deep reactive ion etch (deep RIB) process can be used to form the set of reference cavities 300, 310 and 320. Other well-known types of silicon processing may be used, as described above, to define the precise locations and dimensions of each of these reference cavities, as well as form the cavities to create the necessary right-angle corner(s).

Once all of the optical components have been placed against their associated registration corners within the reference cavities, a single bonding operation may be performed to permanently attach the optical components to their locations. In some cases, thin bond lines are formed along the bottom surface of each optical component, as well as on the "floor" of each reference cavity. In some cases, bonding can be performed by using an adhesive filled with a low filler content and filler particles having a variation of size within a desired bond line limit (e.g., 0.1 µm). The latter approach requires dispensing a small volume of multiple dots within each reference cavity.

Figure 7:
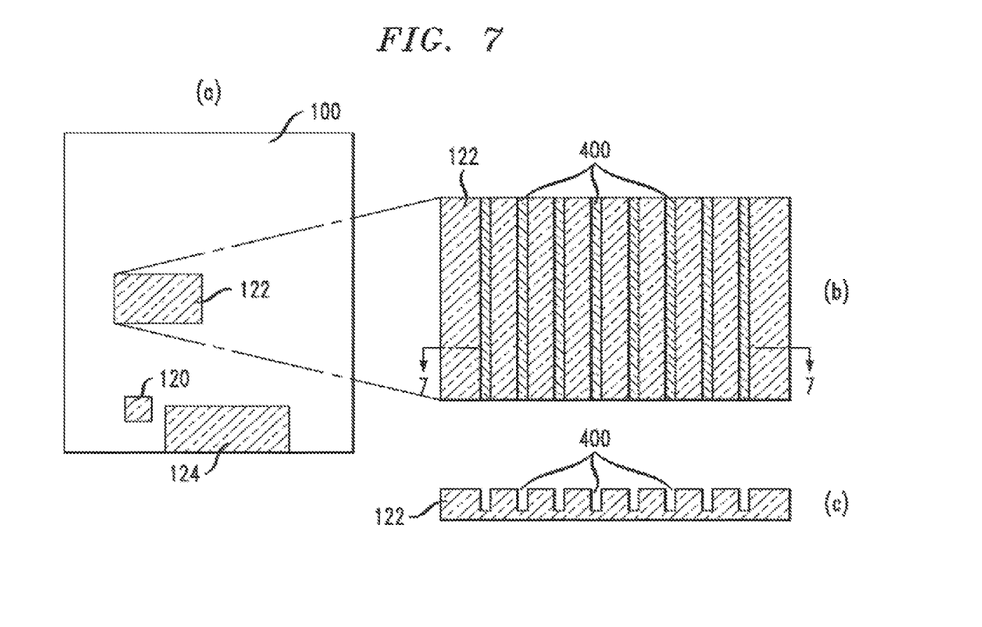
FIG. 7 shows another embodiment of the present invention, in this case including a plurality of grooves formed within at least one of the reference cavities, the grooves used to direct the placement of adhesive material and allow for the creation of thin bond lines, as preferred, with FIG. 7(a) being a top view of an exemplary substrate, including a set of reference cavities, FIG. 7(b) being an enlarged view of one cavity, showing the formation of a plurality of grooves on the floor of the cavity, and FIG. 7(c) being a cut-away side view of the enlargement of FIG. 7(b), taken along line 7-7, showing the grooves in a side view.

FIG. 7 shows another embodiment of the present invention, in this case including a plurality of grooves formed within at least one of the reference cavities, the grooves used to direct the placement of adhesive material and allow for the creation of thin bond lines, as preferred, with FIG. 7(a) being a top view of an exemplary substrate, including a set of reference cavities, FIG. 7(b) being an enlarged view of one cavity, showing the formation of a plurality of grooves on the floor of the cavity, and FIG. 7(c) being a cut-away side view of the enlargement of FIG. 7(b) taken along line 7-7, showing the grooves in a side view. It is to be understood that not all of the cavities need to be formed to include these bonding grooves; rather, the inclusion of shallow grooves is considered to be a design feature that may be used at the discretion of the individual. FIG. 7(a) is a top view of the same arrangement as shown in FIG. 5(b), showing the substrate 100 and the set of three reference cavities 120, 122 and 124. FIG. 7(b) is an enlargement of the reference cavity 122, showing the formation of a plurality of grooves 400 within a bottom surface 410 of the reference cavity 122. FIG. 7(c) is a cut-away side view of the reference cavity 122, showing the location of the plurality of grooves 400. These shallow grooves are used in accordance with the present invention to hold an adhesive material, thus preventing the adhesive lines from having a variation in thickness and/or placement, as was problematic with the prior art.

The grooves 400 may be V-shaped, squared, rectangular, U-shaped, or any desired geometry, with a depth ranging from, for example, 1 µm to 10 µm, and widths also ranging from 1 µm to 10 µm. It is been determined that the use of these adhesive grooves 400 within reference cavities will assist in achieving bond line thickness variation within 0.1 µm across the component dimension. Additionally, the use of the grooves will help in achieving uniform placement of the adhesive across the dimension of the cavity, improving the quality of the adhesion between an inserted optical component and the substrate.

Figure 8:
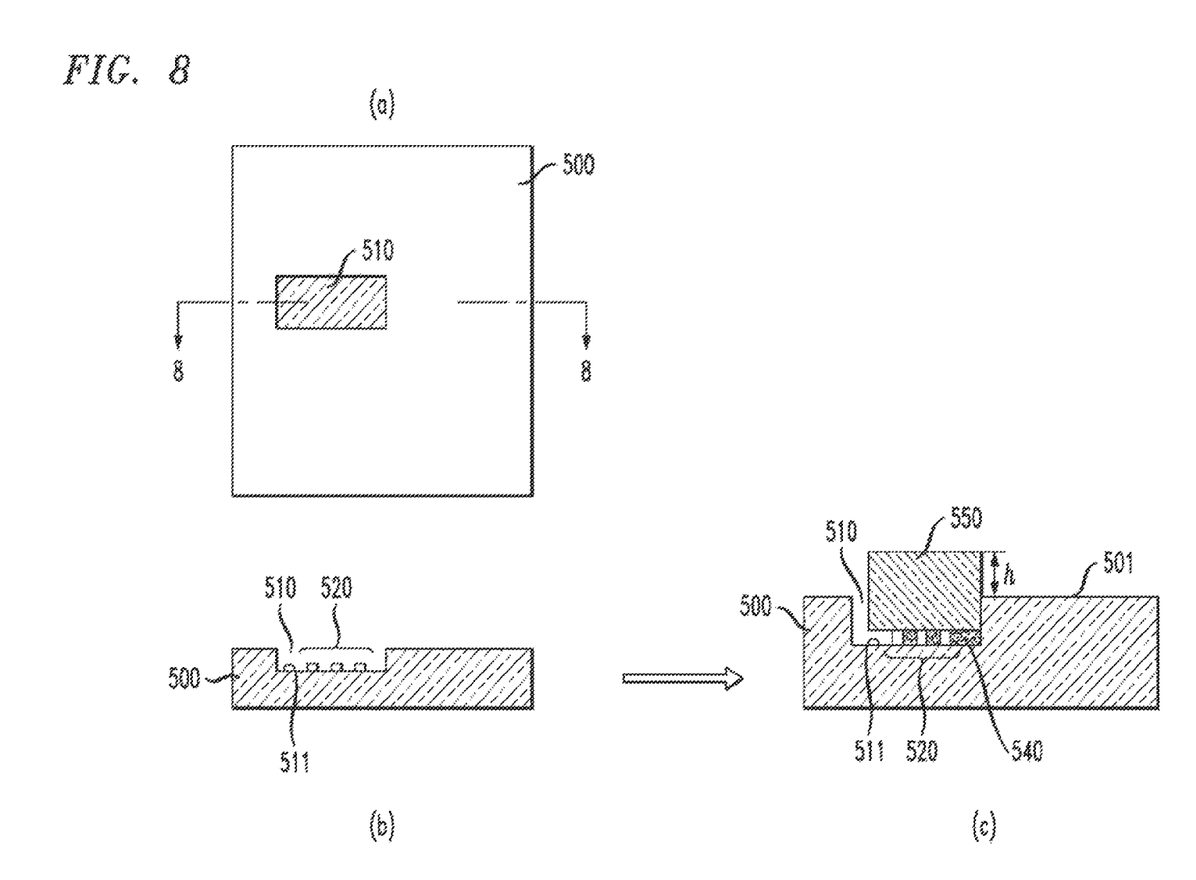
FIG. 8 depicts yet another embodiment of the present invention, in this case including a plurality of ribs formed across the bottom surface of at least one of the reference cavities, the ribs used as a standoff to control the depth of the placement of an optical component with respect to the reference cavity, with FIG. 8(a) being a top view of an exemplary substrate including a reference cavity, FIG. 8(b) being a cut-away side view, taken along line 8-8 and showing the plurality of ribs within the reference cavity, and FIG. 8(c) being a side view illustrating the placement of an optical component on the ribs within the reference cavity.

Instead of forming grooves within the bottom of the reference cavities, it is also possible to include a plurality of ribs in the floor of a reference cavity, which will serve the same purpose of guiding the adhesive material into the channels between the ribs. FIG. 8 depicts yet another embodiment of the present invention, in this case including a plurality of ribs formed across the bottom surface of at least one of the reference cavities, the ribs used as a standoff to control the depth of the placement of an optical component with respect to the reference cavity, with FIG. 8(a) being a top view of an exemplary substrate including a reference cavity, FIG. 8(b) being a cut-away side view, taken along line 8-8 and showing the plurality of ribs within the reference cavity, and FIG. 8(c) being a side view illustrating the placement of an optical component on the ribs within the reference cavity.

In particular, FIG. 8(a) is a top view of a substrate 500 formed to include a reference cavity 510. FIG. 8(b) is a cut-away side view taken along line 8-8 of the view of FIG. 8(a), illustrating the inclusion of a plurality of ribs 520 disposed along a bottom surface 511 of the reference cavity 510. The plurality of ribs 520 functions in a similar manner to the plurality of grooves 400 in terms of providing flow channels for directing the adhesive material to follow, forming a plurality of defined bond lines.

The plurality of ribs 520 additionally forms a standoff arrangement within the reference cavity 520, providing an additional degree of control of the depth of an associated optical component within its associated reference cavity. This aspect is illustrated in FIG. 8(c), which shows an exemplary optical component 550 placed within the reference cavity 510 so as to rest upon the plurality of ribs 520. Adhesive material 540 is disposed in the channels between the adjacent ribs 520 and is used to permanently bond the optical component 550 in place. By controlling the height of ribs 520, the height h of the optical component 550 with respect to a top surface 501 of substrate 500 is controlled.

While the invention has been described in terms of different embodiments, those skilled in the art will recognize that the invention can be practiced with various modifications that are considered to fall within the spirit and scope of the invention as best defined by the claims appended hereto. Furthermore, while the specification has been described in language specific to structural features and/or methodological acts, the claims are not limited to the features or acts described above. Rather, the specific features and acts described above are disclosed as examples for embodiments of the invention.

What is claimed is:

1. An optical assembly, comprising:
   a common substrate including a planar surface comprising a plurality of openings defining a plurality of cavities in the common substrate, each of the cavities of the plurality of cavities formed by internal surfaces comprising a bottom surface and a plurality of wall surfaces that extend from the planar surface to the bottom surface, wherein two of the wall surfaces for each cavity form a right-angle registration corner; and
   a plurality of optical components received within the plurality of cavities and arranged in a spatial relationship wherein each of the plurality of optical components is arranged to exchange an optical signal with a respective other one of the plurality of optical components and supported by the common substrate, wherein each of the plurality of optical components includes a corner abutting against a respective one of the plurality of right-angle registration corners.

2. The optical assembly of claim 1, wherein the plurality of optical components comprises a CMOS photonic chip arranged to exchange the optical signal with a microlens array.

3. The optical assembly of claim 1, wherein the plurality of optical components comprises an optical isolator arranged to exchange the optical signal with a microlens array.

4. The optical assembly of claim 1, wherein the plurality of optical components comprises an optical isolator arranged to exchange the optical signal with a laser diode.

5. The optical assembly of claim 1, wherein the plurality of internal surfaces further comprises grooves partially forming the plurality of recesses, wherein the grooves include respective apexes abutting against respective ones of the plurality of optical components.

6. The optical assembly of claim 5, further comprising adhesive secured to the grooves and the plurality of optical components.

7. The optical assembly of claim 1, wherein each of the optical components are received by the plurality of recesses to a depth, wherein the depth is less than thirty (30) microns.

8. The optical assembly of claim 1, wherein a gap is present between at least one of the plurality of the internal surfaces and an associated one of the plurality of optical components.

9. The optical assembly of claim 1, wherein the common substrate comprises a silicon on insulator (SOI) arrangement.

10. The optical assembly of claim 9, wherein the plurality of cavities extend from the planar surface to a dielectric layer of the common substrate, wherein the planar surface is part of a silicon surface layer.

11. A method, comprising:
etching a plurality of openings in a planar surface of a common substrate to create a plurality of cavities in the common substrate, each of the plurality of cavities including internal surfaces comprising a bottom surface and a plurality of wall surfaces that extend from the planar surface to the bottom surface, wherein two of the wall surfaces for each cavity form a right-angle registration corner; receiving a plurality of optical components within the plurality of cavities; and
arranging each of the plurality of optical components to exchange an optical signal with a respective other one of the plurality of optical components by abutting corners of the plurality of optical components with respective ones of the plurality of right-angle registration corners.

12. The method of claim 11, wherein the arranging includes arranging a CMOS photonic chip to exchange the optical signal with a microlens array.

13. The method of claim 11, wherein the arranging includes arranging an optical isolator to exchange the optical signal with a microlens array.

14. The method of claim 11, wherein the arranging includes arranging an optical isolator to exchange the optical signal with a laser diode.

15. The method of claim 11, wherein the etching includes forming grooves with the plurality of internal surfaces associated with the plurality of cavities, wherein the grooves include respective apexes.

16. The method of claim 15, wherein the receiving includes abutting the plurality of optical components against the apexes of the grooves.

17. The method of claim 11, wherein the receiving includes disposing the plurality of optical components within the plurality of recesses to a depth, wherein the depth is less than thirty (30) microns.

18. The method of claim 11, wherein etching includes forming a gap between at least one of the plurality of the internal surfaces and an associated one of the plurality of optical components.

19. The method of claim 11, wherein the etching includes etching the common substrate comprising a silicon on insulator (SOI) arrangement.

20. The method of claim 19, wherein the etching includes forming the plurality of cavities to extend from the planar surface to a dielectric layer of the common substrate, wherein the planar surface is part of a silicon surface layer.

21. The optical assembly of claim 1, wherein the plurality of wall surfaces forming the plurality of right-angle registration corners are disposed orthogonal or substantially orthogonal to the planar surface.

22. The method of claim 11, wherein the etching includes creating the plurality of wall surfaces forming the plurality of right-angle registration corners at positions orthogonal or substantially orthogonal to the planar surface.

23. The optical assembly of claim 1, wherein the abutments register a two-dimensional location of the corners of the plurality of optical components with respect to the planar surface.

24. The method of claim 11, wherein the abutting the corners include registering two-dimensional locations of the corners of the plurality of optical components with respect to the planar surface.

* * * * *